United States Patent Office 2,781,276
Patented Feb. 12, 1957

2,781,276

METHOD OF TREATING BENZYL CELLULOSE

Walter E. A. Simon, Kiel-Wellingdorf, Germany, assignor to Brycel Limited, Hackbridge, England No Drawing. Application May 25, 1954,
Serial No. 432,333

Claims priority, application Great Britain
February 3, 1950

3 Claims. (Cl. 106—197)

This application is a continuation-in-part of my application Serial No. 207,426 (Patent 2,692,834) filed January 23, 1951, for Improvements in or Relating to Cellulosic-Derivative Compositions.

The object of this invention is to prevent formation of bubbles in benzyl cellulose which has a tendency to decompose on heating to yield benzaldehyde.

The formation of aldehydes has been a severe disadvantage in the use of such ethers as "plastics" because of the formation by the aldehydes, on cooling, of pores or bubbles, unless very heavy pressures are used.

In addition, the presence of aldehydes is undesirable because of subsequent formation of peroxidic substances which bring about rapid deterioration of the plastics.

Known methods of stabilisation consist of addition of reducing substances capable of destroying the peroxidic substance but not reacting with the aldehyde itself and the quantities of such stabilisers are in no way related to the quantity of aldehyde present in a given sample.

According to the present invention, we provide a process for stabilising ethers of carbohydrates which have a tendency to decompose and yield aldehydes when heated, which comprises treating the said substances with a stabilising material that will convert any such aldehyde into a compound which is stable and non-gaseous at subsequent processing temperatures, the said treatment being carried out with the composition in a molten or semi-molten state, chemically inert materials such as plasticisers, fillers and lubricants being present if desired. Said material is a phenol (which term includes cresols).

The catalyst is preferably dibenzylamine or diphenylguanidine. The catalyst may be in quantity 0.5 to 0.15 of the quantity of stabilising material. The period of maintaining the ingredients at reacting temperature may be 1 to 3 hours. The temperature may be 140–250° C., generally 160–240° C.

Thus the aldehyde is converted into a chemically inert resinous extender or plasticiser for the ether. The said substance will be heated to a temperature suitable for bringing it to the molten or semi-molten condition, e. g., 140 to 175° C., usually 160 to 170° C.

The required quantity of the said stabilising material may be slightly greater than equimolecular quantity to the aldehyde liable to be reduced from the raw material during processing. This quantity may be assessed by heating a sample of the ether to say 220 to 240° C. for 2 hours, thereby distilling off the aldehyde and the quantity of the stabilising material known to react therewith can then be calculated.

Benzylcellulose treated in accordance with the invention may be used for many purposes, e. g., coatings, textile fibres, windscreens, insulators, varnishes, and gramophone records. The physical condition of the material may vary between a hard solid body to a body having the elasticity of leather.

Example 1

7.5 grams of aniline were mixed with 1000 grams benzyl cellulose in an internal mixer; maintained at 140° C. After 20 minutes 200 grams tricresylphosphate and 100 grams dioctylphthalate were mixed in, and the resultant plastic used for extrusions.

Example 2

A sample of benzylated beech wood, when treated as described in Example 1, yielded 1.0% benzaldehyde. 1000 grams of this material was thoroughly mixed in an internal mixer with 8.9 grams of phenol (equivalent to 10 grams of benzaldehyde) and 0.8 gram of diphenylguanidine as catalyst for 2 hours at 200° C. Then 500 grams of precipitated calcium carbonate (filler) were added and the mixing continued for another ½ hour. The resulting plastic composition was used for press moulding.

I claim:

1. A method of treating benzyl cellulose to avoid the formation of bubbles and pores in a plastic composition formed therewith comprising heating benzyl cellulose to a flowable condition and mixing the heated benzyl cellulose with a phenol, together with an alkaline catalyst to ensure reaction between said additional substance and the benzaldehyde, the quantity of said substance being that calculated to react with the benzaldehyde recoverable from a quantity of the benzyl cellulose on heating it to 220–240° C. for two hours.

2. A method as claimed in claim 1 wherein the catalyst comprises a substance selected from the group consisting of dibenzylamine and diphenylguanidine.

3. A process as claimed in claim 1 wherein the mixture is heated for 1 to 3 hours at 140 to 250° C.

References Cited in the file of this patent

UNITED STATES PATENTS

| Number | Name | Date |
|---|---|---|
| 1,460,097 | Donohue | June 26, 1923 |
| 1,467,092 | Carroll | Sept. 4, 1923 |
| 1,467,094 | Carroll | Sept. 4, 1923 |
| 1,467,096 | Carroll | Sept. 4, 1923 |
| 2,362,166 | Speicher | Nov. 7, 1944 |
| 2,558,047 | Gloor | June 26, 1951 |
| 2,692,834 | Simon | Oct. 26, 1954 |